United States Patent
Crawford et al.

(10) Patent No.: US 10,425,483 B2
(45) Date of Patent: Sep. 24, 2019

(54) DISTRIBUTED CLIENT BASED CACHE FOR KEYS USING DEMAND FAULT INVALIDATION

(71) Applicant: International Business Machines Corporation, Armonk, NY (US)

(72) Inventors: Catherine H. Crawford, Carmel, NY (US); Kevin Gildea, Bloomington, NY (US); Mark R. Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/155,955

(22) Filed: May 16, 2016

(65) Prior Publication Data

US 2017/0329740 A1  Nov. 16, 2017

(51) Int. Cl.
  *H04L 29/08* (2006.01)
(52) U.S. Cl.
  CPC ...... *H04L 67/1097* (2013.01); *H04L 67/2842* (2013.01); *G06F 2212/154* (2013.01); *G06F 2212/163* (2013.01)
(58) Field of Classification Search
  CPC ........... G06F 15/17331; G06F 12/0802; G06F 2212/154; G06F 2212/163; H04L 67/1097; H04L 67/2842
  See application file for complete search history.

(56) References Cited

U.S. PATENT DOCUMENTS

| | | | |
|---|---|---|---|
| 2013/0103729 A1 | 4/2013 | Cooney et al. | |
| 2014/0143369 A1 | 5/2014 | Dobre | |
| 2014/0325011 A1 | 10/2014 | Guerin et al. | |
| 2014/0325012 A1* | 10/2014 | Guerin | G06F 15/17331 709/212 |
| 2015/0127658 A1 | 5/2015 | Ding et al. | |
| 2015/0302111 A1 | 10/2015 | Yue et al. | |
| 2017/0039145 A1* | 2/2017 | Wu | G06F 17/30902 |

\* cited by examiner

*Primary Examiner* — John M MacIlwinen
(74) *Attorney, Agent, or Firm* — Scully, Scott, Murphy & Presser, P.C.; Kevin Jordan, Esq.

(57) ABSTRACT

A method and system of storing and retrieving data in a computer system are disclosed. In an embodiment, the method comprises storing a data object at a specified location in a first data store, storing in a second data store first information identifying said specified location, retrieving the data object from a defined location in the first data store, obtaining second information identifying the defined location in the first data store, and comparing the second information to the first information to determine if the first information and the second information identify a same location in the first data store. In embodiments of the invention, the method further comprises when the second information and the first information identify different locations in the first data store, generating a fault signal to indicate that the location of the data object in the first data store has changed.

25 Claims, 5 Drawing Sheets

DISTRIBUTED CLIENT BASED CACHE FOR KEYS USING DEMAND FAULT INVALIDATION

BACKGROUND

This invention generally relates to data storage, and more specifically, to key-value based storage.

In a key-value (KV) store system, an arbitrary label (the key) is attached to data (the value) to be stored, and a pair of (key,value) is stored. Then, when acquiring the stored data, the label (key) is specified and the corresponding data (value) is acquired. A key-value storage system is a representative of a non-relational database and lifts a strict limitation on a relationship between a field structure and a table in a relational database. By enabling a key value to correspond to stored data and using a simplified data model, the KV storage system has a number of significant advantages.

A first advantage is high scalability. Because there is no strict limitation on a relationship between a field structure and a table in a KV storage system, distributed applications can be easily deployed on several servers in the KV storage system, thereby improving scalability of the entire system and achieving higher convenience and flexibility. Another important advantage of KV storage systems is adaption to mass storage and high throughput capabilities required for cloud computing. The KV storage system can better meet a flexible requirement of a user for scalability in a cloud computing environment.

The plethora of key-value based storage has made distributed in-memory remote object caching a reality in modern scale out systems in a variety of Big data problems. Optimizing these runtimes to reduce latency and increase throughput is of great importance to continue to support new applications as well as to provide competitive cloud and data center infrastructures as new advances in processors, network and storage are available.

SUMMARY

Embodiments of the invention provide a method and system of storing and retrieving data in a computer system. In an embodiment, the method comprises storing a specified data object at a specified location in a first data store of the computer system, storing in a second data store of the computer system first information identifying said specified location, retrieving the specified data object from a defined location in the first data store, and obtaining second information identifying the defined location in the first data store, and comparing the second information to the first information to determine if the first information and the second information identify a same location in the first data store.

Embodiments of the invention provide a method and system of distributed client based cache for keys using demand fault invalidation with active messaging. In an embodiment, the method comprises each of a plurality of distributed clients sending respective data objects to a server; wherein the server stores the data objects in a server data store; each of the distributed clients receiving respective first rkey values for, and identifying storage locations of, the data objects sent to the server by the each client; each of the distributed clients storing the respective first rkey values received from the server in a local cache of the each distributed client; one of the distributed clients obtaining a specified one of the data objects, including determining if the first rkey value for the specified data object is in the local cache of the one distributed client; and when the first rkey value for the specified data object is in the local cache of the one distributed client, invoking remote direct memory access, and using said first rkey value for the specified data object, to obtain the specified data object from the server data store; said one of the distributed clients receiving from the server a second rkey value for the specified data object, and comparing the second rkey value to the first rkey value for the specified data object to determine if the storage location of the specified object in the server data store has changed.

Embodiments of the invention use a unique identifier for cached keys based on remote server IP address, port ID and memory location that is appended to the objects in the KV store and maintained by the server. The client uses cached keys to leverage remote direct memory access (RDMA) Active messaging to retrieve data without going through the server lookup protocol while also being able to use the unique identifier to see if the key and corresponding value have changed.

Embodiments of the invention provide an approach to speed up client data access to the object storage servers by caching the lookup keys locally on the client within the application execution space via a library. This approach does not require server based updates, broadcasts, or likewise to remote caches—updates are only done (and hence reducing network traffic) when the client needs to access data and invalidate keys.

DETAILED DESCRIPTION

Figure 1:
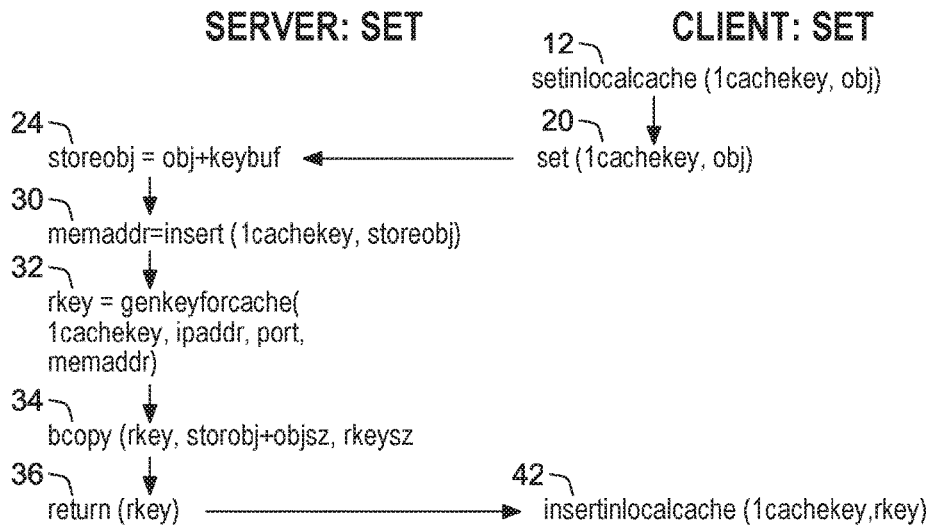
FIG. 1 illustrates a control flow of an embodiment of the invention in a set operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention provide a method and system or key-value (KV) based data storage. As discussed above, the plethora of key-value based storage has made distributed in-memory remote object caching a reality in modern scale out systems in a variety of Big Data problems. Optimizing these runtimes to reduce latency and increase throughput is of great importance to continue to support new applications as well as to provide competitive cloud and data center infrastructures as new advances in processor, network and storage are available.

Embodiments of the invention provide an approach to speed up client data access to the object storage servers by caching the lookup keys locally on the client within the application execution space via a library. This approach does not require server based updates, broadcasts, or likewise to remote caches—updates are only done (and hence reducing network traffic) when the client needs to access data and invalidate keys.

Embodiments of the invention use a unique identifier for cached keys based on remote server IP address, port ID and memory location that is appended to the objects in the KV store and maintained by the server. The client uses cached keys to leverage remote direct memory access (RDMA) Active Messaging to retrieve data without going through the server lookup protocol while also being able to use the unique identifier to see if the key and corresponding value have changed.

Figure 2:
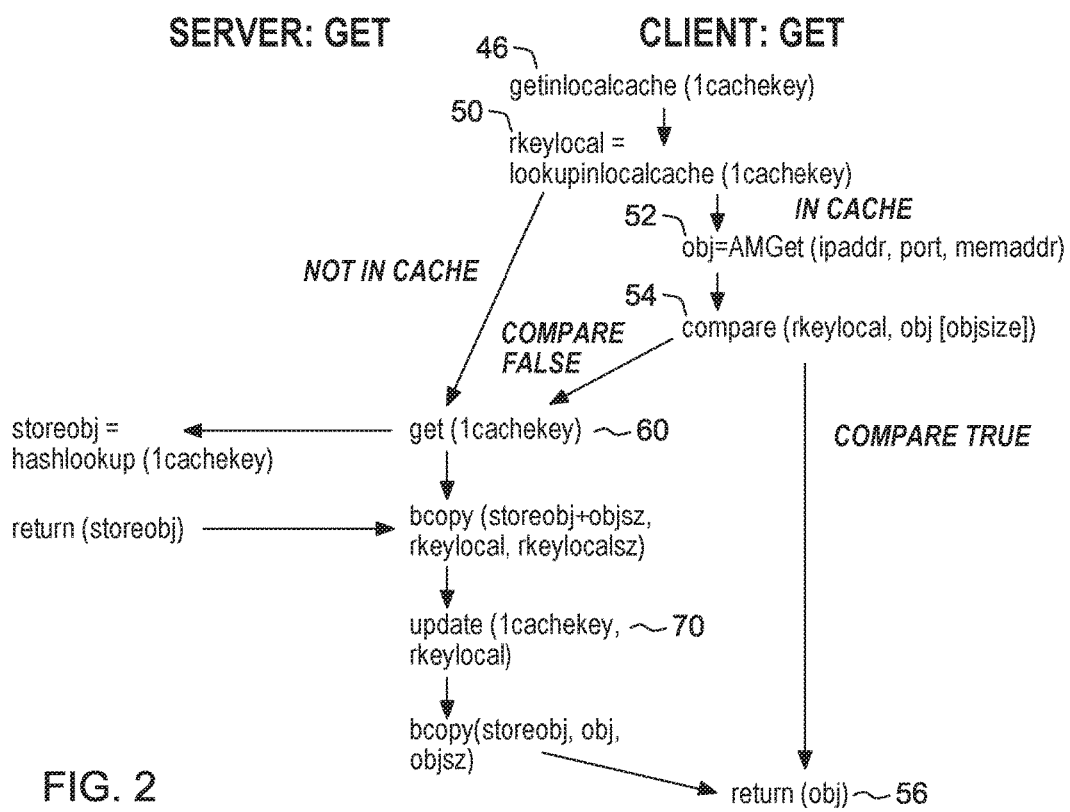
FIG. 2 illustrates a control flow of an embodiment of the invention in a get operation.
Figure 3:
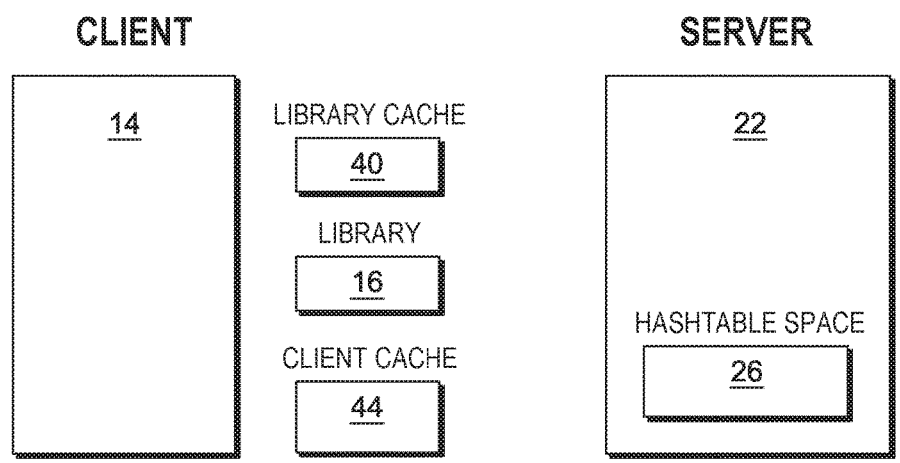
FIG. 3 shows client and server computers that may be used in the implementation of the set and get operations illustrated in FIGS. 1 and 2.

FIGS. 1 and 2 illustrate set and get operations in accordance with embodiments of the invention, and FIG. 3 shows, as an example, client and server computers that may be used in these set and get operations. It may be noted that, in embodiments of the invention, other functions not specifically described herein such as cache creation and initialization via client setting, cache destruction, and cache clears may also be available and include such features as page pinning to avoid race conditions in RDMA.

In the set operation, an objective is to associate a key with an object as described by the client. In embodiments of the invention, the remote key-value storage is managing consistent and persistent set operations across all servers and clients.

With reference to FIGS. 1, 2 and 3, at 12, the client 14 calls the function setinlocalcache(lcachekey, obj) and this is handled by the client library 16 which, at 20, calls the generic set(lcachekey, obj) for the remote key value store.

The server 22 handles the set call by first following its own redundancy, consistency, and availability logic for the basic operation and then, at 24, creating a storeobj for the (key, obj) tuple which is a copy of the obj from the client with additional buffer space for the unique value which will be used to determine key validity by the client local cache library.

On the server 22, the object is inserted using atomic operations (e.g. locks) into the store's hashtable space 26 and the memory address 30 of the object is returned.

At 32, the server 22 creates a new rkey from the lcachekey, IP address and Port ID of the server, as well as the memory address within the key value process of where the object is stored. The memory address will allow for Active Messaging semantics to directly access this object from the client 14 over Remote Direct Memory Access (RDMA) protocol of RDMA implemented over software so as to bypass the key lookup semantics typical of GET operations on these servers. Furthermore, the memory address allows for a unique identifier for this object; and if this memory address changes when an object with the lcachekey is returned by the store in later operations, the client must update its own local cache with this new rkey. (This is later described in the GET operation.)

At 34, the server 22 copies the rkey into the buffer space in storeobj. At 36, the server returns rkey to the client library cache 40 and at 42, rkey is inserted into the client with a hash based on the lcachekey for future lookup in the local client cache 44.

In the GET operation, the client cache library 40 is responsible for comparing the cached location of the object with the current location that is returned with the object IF the key for that object is in the local client cache 44. If the key is not in the local client cache 44, the client library 40 is responsible for retrieving the value from the remote store using the standard get( ) function supplied with the storage library and then inserting the new value for that key into the local cache.

At 46, the client 14 calls getinlocalcache(lcachekey) and this is handled by the client cache library 40 which, at 50, looks up to see if the lcachekey is cached in the local cache 44. If lcachekey is in the local cache, then at 52, the client uses an ActiveMessaging RDMA given the cached values for server IP address, port ID, and memory address to fetch the object. Note that the Active Messaging library on the server must also leverage the atomic mechanism of the server side SET insert operation and GET retrieve operation to guarantee atomicity for rkey. If there is an error, the client library 16 calls the stock storage get( ) function.

If an object is returned, then at 54 the client side library 16 compares the rkey appended at the end of the returned storeobj to the locally cached rkey. If the rkeys are the same, the RDMA-ed object is returned, at 56, to the client application caller; if the rkeys are different, then at 60 the client cache library 40 calls the standard storage library get(lcachekey) to retrieve the object.

If the lcachekey is not in the local cache 44, then at 60 the client library 16 calls the standard storage library get(lcachekey) to retrieve the object. If the client side cache library 40 does call the generic get( ) function, then at 70 the library 16 updates (or inserts) its local cache with the new lcachekey, rkey) pair. The obj is retrieved from the server storage using atomic operations (e.g. locks) and returned to the calling application on the client.

Embodiments of the invention maintain a table of data memory locations resident in separate process memory spaces and provide software mechanisms to generate faults when data locations in memory have changed.

In embodiments of the invention, processes maintain private tables for memory data locations. In one embodiment, private tables leverage remote direct memory access (RDMA) address labels as a mechanism to provide both uniqueness of keys as well as speed retrieval of data.

In embodiments of the invention, an invalid state is detected by a process when that process accesses remote data for the first time, in which case a private table entry does not exist, or when the remote data memory location has changed, in which case the retrieved data address label does not match the entry in the private table. In either case, invalidation is triggered by action on part of the process, and only when the remote data memory location changed. In an embodiment, there is no need to broadcast invalidate on data modification.

In embodiments of the invention, demand-fault invalidation can support a range of transaction/concurrency policies. In one embodiment, a database management system may use multi-version concurrency control (MVCC) to implement concurrent transactions. Reader transactions access consistent data from an original memory location, while a writer transaction creates an updated copy at a different memory location. Future transactions go through the demand-fault invalidation process, and retrieve data from the updated location.

In embodiments of the invention, process access to data can be provided by a range of different transport mechanisms. In one embodiment, this may be networked RDMA; in another embodiment, PCI Express attached.

In embodiments of the invention, each processes view of the data may be independent of transformations. In one embodiment, data may be compressed on remote system, then decompressed after transfer to the process. In another embodiment, data may be encrypted.

Embodiments of the invention provide a number of important advantages. For instance, embodiments of the invention are entirely client demand based for updating stale/dirty values in the cache—clients only generate network traffic when the client application requires an update thus removing the requirement for servers to broadcast unnecessary data to clients who may never access that remote data again during the life of the process. In addition, embodiments of the invention leverage the consistency and transaction semantics of the remote object server backing store by only caching keys, not the value associated with the keys (this means the client is not responsible for negotiating consistency with the distributed database). Further, embodiments of the invention do not require any sharing or concurrency management across client processes for key caching or data access.

Figure 4:
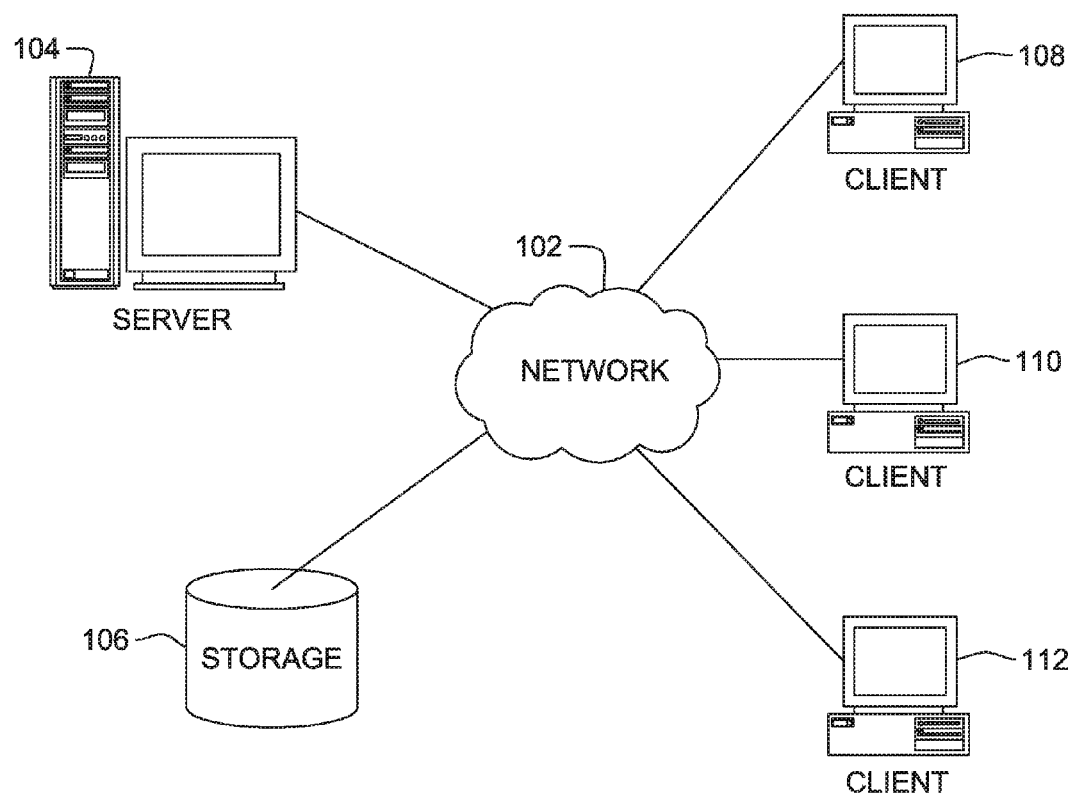
FIG. 4 is a diagram illustrating an exemplary network data processing system that may be used to implement an embodiment of this invention.

With reference now to FIG. 4, a pictorial representation of a network data processing system 100 is presented in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and programs to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 5:
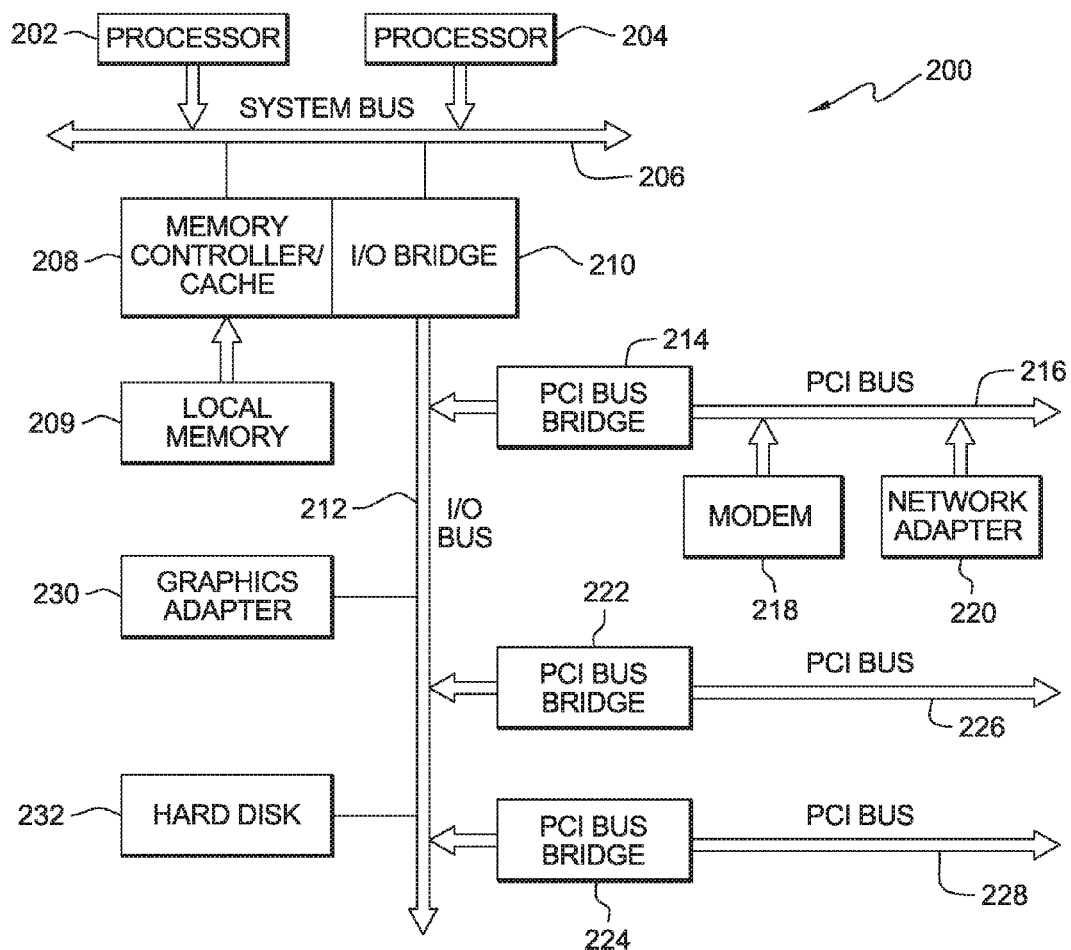
FIG. 5 is a block diagram of a data processing system that may be implemented as a server in the network of FIG. 4.

Referring to FIG. 5, a block diagram of a data processing system that may be implemented as a server, such as Server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 4 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 5 may be, for example, an IBM e-Server pSeries system, a product of International Business Machines Corporation in Armonk, N.Y., running the Advanced Interactive Executive (AIX) operating system or LINUX operating system.

Server 104 may provide a suitable website or other internet-based graphical user interface accessible by users to enable user interaction for aspects of an embodiment of the present invention. In one embodiment, Netscape web server, IBM Websphere Internet tools suite, an IBM DB2 for Linux, Unix and Windows (also referred to as "IBM DB2 for LUW") platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical website might include, in addition to standard HTML documents, various forms, Java applets, JavaScript, active server pages (ASP), Java Server Pages (JSP), common gateway interface scripts (CGI), extensible markup language (XML), dynamic HTML, cascading style sheets (CSS), helper programs, plug-ins, and the like.

Figure 6:
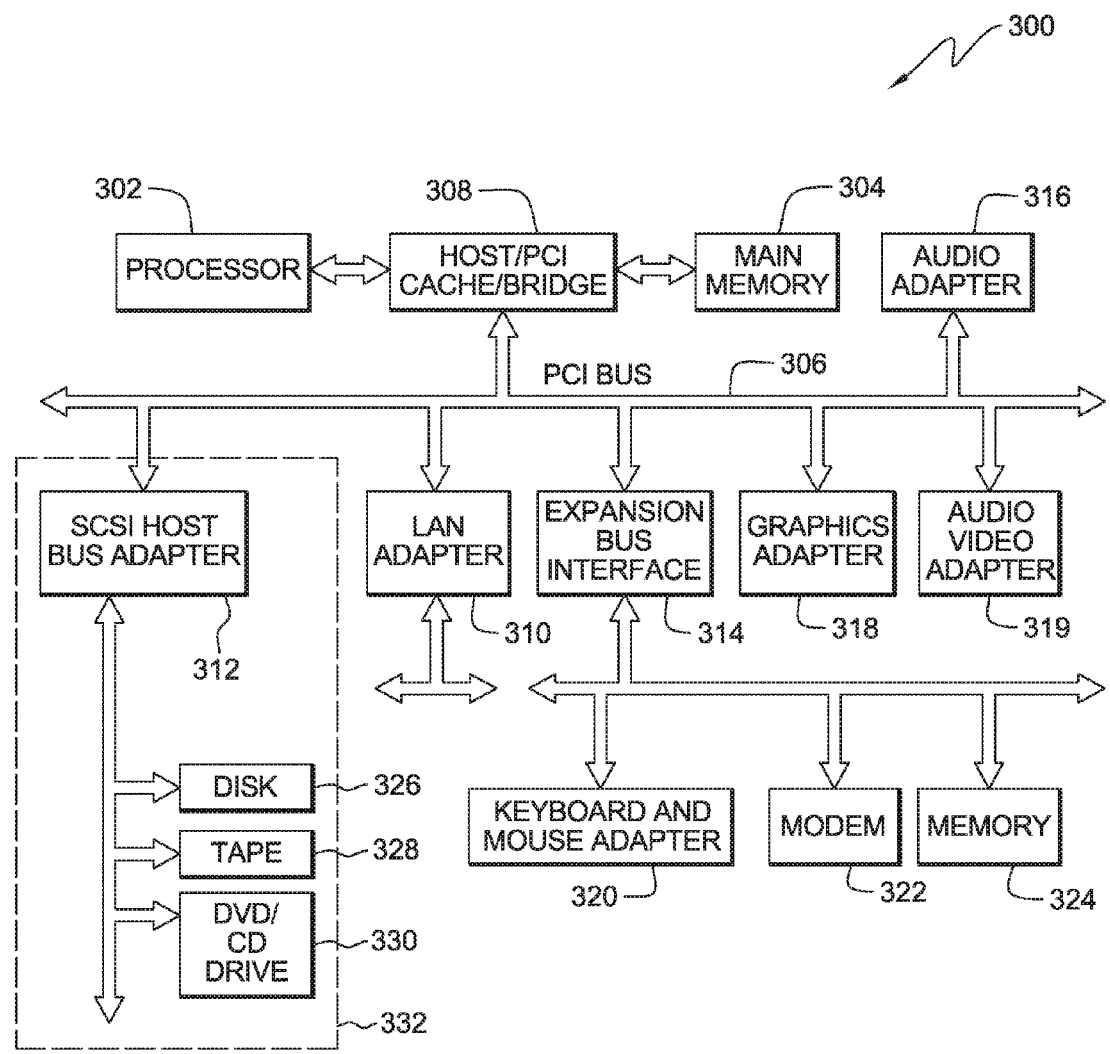
FIG. 6 is a block diagram of a data processing system that may be implemented as a client in the network of FIG. 4.

With reference now to FIG. 6, a block diagram illustrating a data processing system is depicted in which aspects of an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 6. The operating system may be a commercially available operating system, such as Windows XP®, which is available from Microsoft Corporation. An object oriented programming system such as Java may run in conjunction with the operating system and provide calls to the operating system from Java programs or programs executing on data processing system 300. "Java" is a trademark of Sun Microsystems, Inc. Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 6 may vary depending on the implementation. Other internal hardware or peripheral devices, such as flash ROM (or equivalent nonvolatile memory) or optical disk drives and the like, may be used in addition to or in place of the hardware depicted in FIG. 6. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 6 and above-described examples are not meant to imply architectural limitations. For example, data processing system 300 may also be a notebook computer or hand held computer as well as a PDA. Further, data processing system 300 may also be a kiosk or a Web appliance. Further, the present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of storing and retrieving data in a client-server computer system, the method comprising:
    a server computer receiving from a client computer a key-object pair including a specified data object, storing the specified data object of the key-object pair at a specified location in a first data store of the computer system, creating an rkey associated with the specified data object and including a memory address of the stored specified data object in the first data store, and returning the rkey to the client computer;
    the client computer storing the rkey in a cache of the client computer;
    the client computer using the rkey and a specified function for retrieving a key-value pair from said memory address in the first data store, said retrieved key-value pair including a defined data object and an associated rkey;
    the client computer comparing the rkey in the retrieved key-value pair to the rkey stored in the cache of the client computer to determine if the rkey in the retrieved key-value pair and the rkey stored in the cache of the client computer are the same; and
    when the rkey in the retrieved key-value pair and the rkey stored in the cache of the client computer are not the same, the client computer using another function to retrieve from the server computer the specified data object with a new rkey for the specified data object, and the client computer storing the new rkey in the cache of the client computer.

2. The method according to claim 1, further comprising when the second information and the first information identify different locations in the first data store, replacing the first information in the cache of the client computer with the second information.

3. The method according to claim 2, further comprising when the second information and the first information identify different locations in the first data store, generating a fault signal to indicate that the location of the specified data object in the first data store has changed.

4. The method according to claim 1, wherein the retrieving the specified data object includes using the first information to retrieve the specified data object from the first data store.

5. The method according to claim 4, wherein the retrieving the specified data object further includes when the specified data object is not at the location identified by the first information, a client computer of the computer system recognizing that the first information is incorrect and taking defined action to retrieve the specified data object.

6. The method according to claim 4, wherein the retrieving the specified data object further includes using remote direct memory access to retrieve the specified data object from the first data store.

7. The method according to claim 1, wherein the storing the specified data object includes:
    the client computer of the computer system sending the specified data object to the server computer of the computer system; and
    the server computer storing the specified data object in the first data store, and sending the first information to the client computer.

8. The method according to claim 7, wherein the retrieving the specified data object includes:
    the client computer requesting the specified data object from the server computer; and
    the server computer sending the specified data object and the second information to the client computer.

9. The method according to claim 8, wherein the server computer storing the specified data object includes the server computer creating a store object comprising the specified data object and a key associated with the specified data object.

10. The method according to claim 9, wherein the server computer storing the specified data object further includes the server computer creating a new key associated with the specified data object, and sending the new key to the client computer.

11. A server-client computer system for storing and retrieving data, the computer system comprising:
    a server computer and a client computer;
    the server computer receiving from the client computer a key-object pair including a specified data object, for storing the specified data object of the key-object pair at a specified location in a first data store of the computer system, for creating an rkey associated with the specified data object and including a memory address of the stored specified data object in the first data store, and for returning the rkey to the client computer; and
    the client computer for storing the rkey in a cache of the client computer, and the client computer using the rkey and a specified function for retrieving a key-value pair from said memory address in the first data store, said retrieved key-value pair including a defined data object and an associated rkey;

the client computer comparing the rkey in the retrieved key-value pair to the rkey stored in the cache of the client computer to determine if the rkey in the retrieved key-value pair and the rkey stored in the cache of the client computer are the same; and when the rkey in the retrieved key-value pair and the rkey stored in the cache of the client computer are not the same, the client computer using another function to retrieve from the server computer the specified data object with a new rkey for the specified data object, and the client computer storing the new rkey in the cache of the client computer.

12. The computer system according to claim 11, wherein when the second information and the first information identify different locations in the first data store, the client computer replaces the first information in the cache of the client computer with the second information.

13. The computer system according to claim 12, wherein when the second information and the first information identify different locations in the first data store, the client computer generates a fault signal to indicate that the location of the specified data object in the first data store has changed.

14. The computer system according to claim 11, wherein the server computer uses the first information to retrieve the specified data object from the first data store.

15. A method of distributed client based cache for keys using demand fault invalidation with active messaging in a client-server computer system, the method comprising:

each of a plurality of distributed clients sending respective key-object pairs including a specified data object to a server; wherein the server stores the data objects of the key-object pairs in a server data store, and creates an rkey associated with each of the specified data objects and including a memory address of the each stored data object in the server data store;

each of the distributed clients receiving a respective one of the rkey values for, and identifying the storage locations of, the data object sent to the server by the each client;

each of the distributed clients storing the respective rkey value received from the server in a local cache of the each distributed client;

one of the distributed clients obtaining a key-value pair from the server data store, including determining if the rkey value for the specified data object is in the local cache of the one distributed client; and when the rkey value for the specified data object is in the local cache of the one distributed client, invoking remote direct memory access, and using the rkey value received by said one distributed client for the specified data object, to obtain the key-value pair from the server data store;

said one of the distributed clients comparing the rkey value in the obtained key-value pair to the rkey value stored in the local cache of the distributed client to determine if the storage location of the specified data object sent to the server by said one of the distributed clients has changed; and when the rkey in the retrieved key-value pair and the rkey stored in the cache of the one of the distributed clients are not the same, the one of the distributed clients using another function to retrieve from the server computer the specified data object with a new rkey for the specified data object, and the one of the distributed clients storing the new rkey in the cache of the one of the distributed clients.

16. The method according to claim 15, wherein the determining if the first rkey value of the specified data object is in the local cache of the one distributed client includes said one of the distributed clients calling a local client library cache, and the local client library cache determining if the first rkey value is in the local cache.

17. The method according to claim 16, wherein when the local client library cache determines that the first rkey value is not in the local cache, the local client library cache calling a get function to obtain the specified data object from the server.

18. The method according to claim 15, wherein:

the one of the distributed clients obtaining a specified one of the data objects from the server data store includes said one of the distributed clients sending to the server an address of one of the storage locations in the server data store; and when the specified data object is not at said address of one of the storage locations, the one of the distributed clients taking action to find the specified data object in the server data store.

19. The method according to claim 16, further comprising the local client library cache updating the first rkey value in the local cache with the second rkey value.

20. A client-server computer system of distributed client based cache for keys using demand fault invalidation with active messaging, the system comprising:

a plurality of distributed clients for sending respective key-object pairs including a specified data object to a server, wherein the server stores the data objects of the key-object pairs in a server data store, creates an rkey associated with each of the specified data objects and including a memory address of the each stored data object in the server data store, and returns to the clients the rkey values identifying the storage locations of the data objects, each of the distributed clients including a local client cache and a local client library; and wherein:

each of the distributed clients receives a respective one of the rkey values for, and identifying the storage locations of, the data object sent to the server by the each client;

one of the distributed clients obtains a key-value pair from the server data store, including calling the local client library of the one of the distributed clients, and the local client library determines if the rkey value received by said one distributed client is in the local cache of the one of the distributed clients; and when the rkey value received by said one distributed client is in the local cache of the one distributed client, remote direct memory access is invoked, and said rkey value received by said one distributed client and a specified function are used, to obtain the key-value pair from the server data store; and said one of the distributed clients compares the rkey value in the obtained key-value pair to the rkey value stored in the local cache of the distributed client to determine if the storage location of the specified data object sent to the server by said one of the distributed clients has changed; and when the rkey in the retrieved key-value pair and the rkey stored in the cache of the one of the distributed clients are not the same, the one of the distributed clients using another function to retrieve from the server computer the specified data object with a new rkey for the specified data object, and the one of the distributed clients storing the new rkey in the cache of the one of the distributed clients.

21. The system according to claim 20, wherein when the local client library determines that the first rkey value is not in the local cache, the local client library cache calls a get function to obtain the specified data object from the server.

22. The system according to claim 20, wherein:
the one of the distributed clients sends to the server an address of one of the storage locations in the server data store; and
when the specified data object is not at said address of one of the storage locations, the one of the distributed clients takes defined action to find the specified data object in the server data store.

23. A method of distributed client based cache for keys using demand fault invalidation with active messaging in a computer network, the computer network comprising a plurality of distributed clients and a server, each of the distributed clients including a local client cache and a local client library, the method comprising:
each of the distributed clients sending respective key-object pairs including a specified data object to the server;
the server storing the data objects of the key-object pairs in a server data store, and returning to each of the distributed clients a respective one rkey value for, and identifying a storage location of, the data object sent to the server by the each client;
each of the distributed clients receiving the respective one rkey value for, and identifying the storage location of, the data object sent to the server by the each client, and storing the respective one rkey value received from the server in the local cache of the each distributed client;
one of the distributed clients obtaining a key-value pair from the server data store, including calling the local client library of the one of the distributed clients, and the local client library determining if the rkey value received by said one distributed client is in the local cache of the one of the distributed clients; and when the rkey value received by said one distributed client is in the local cache of the one distributed client, invoking remote direct memory access, and using said rkey value received by said one distributed client, to obtain the key-value pair from the server data store;
said one of the distributed clients comparing the rkey value in the obtained key-value pair to the rkey value stored in the local cache of the distributed client to determine if the storage location of the specified data object sent to the server by said one of the distributed clients has changed; and
when the rkey in the retrieved key-value pair and the rkey stored in the cache of the one of the distributed clients are not the same, the one of the distributed clients using another function to retrieve from the server computer the specified data object with a new rkey for the specified data object, and the one of the distributed clients storing the new rkey in the cache of the one of the distributed clients.

24. The method according to claim 23, wherein the one of the distributed clients obtaining a specified one of the data objects further includes:
the one of the distributed clients sending to the server an address of one of the storage locations in the server data store; and
when the specified data object is not at said address of one of the storage locations, the one of the distributed clients taking defined action to find the specified data object in the server data store.

25. The method according to claim 1, wherein the client computer using the rkey for retrieving a key-value pair from said memory address in the first data store includes:
the client computer determining if the rkey associated with the specified data object is stored in the local cache;
when the client computer determines that the rkey associated with the specified data object is not in the local cache, the client computer using said another function for retrieving the specified data object, and the client computer storing the specified data object for the rkey into the cache of the client computer; and
when the client computer determines that the rkey associated with the specified data object is in the local cache, the client computer using the rkey associated with the specified data object to retrieve the key-value pair from said memory address.

* * * * *